April 7, 1936. P. KOLLSMAN 2,036,582
FUEL GAUGE
Filed Sept. 17, 1932
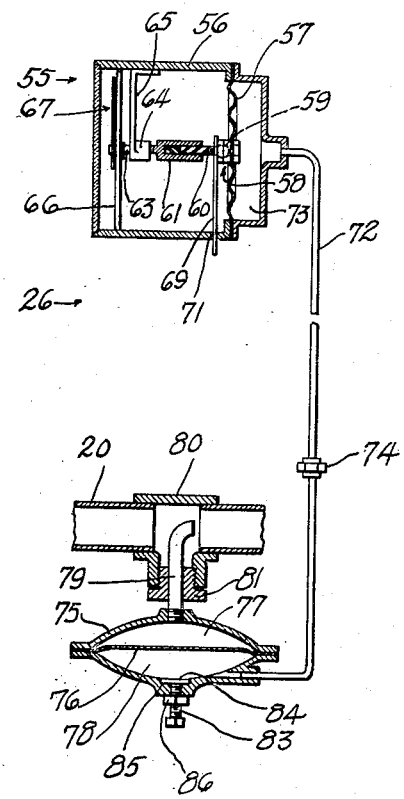
INVENTOR
Paul Kollsman
BY
ATTORNEY Patented Apr. 7, 1936

2,036,582

UNITED STATES PATENT OFFICE 2,036,582

FUEL GAUGE

Paul Kollsman, Woodhaven, N. Y.

Application September 17, 1932, Serial No. 633,606

3 Claims. (Cl. 73—54)

This invention relates to liquid level or pressure gauges having fluid filled conduits for actuating a remote indicator.

One object of the invention is to provide a device of the character described, in which a highly pliable pressure transmitting diaphragm is employed in the conduit mentioned, and improved means provided in improved relation to the diaphragm for initially setting the same to assure a predetermined quantity of fluid in the normally closed conduit, and to obtain a relatively maximum range of movement for the diaphragm.

A further object of the invention is to construct a fuel gauge having relatively few and simple parts, and which is inexpensive to manufacture, easy and convenient to mount, and reliable and efficient to a high degree in use.

Other objects and advantages of the invention will become apparent as the specification proceeds.

The drawing shows a view in vertical section of a gauge system embodying the invention.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Generally described, the invention provides a gauge for a tank containing a liquid such as fuel. This tank may be variously arranged or located, but certain advantages of the invention can best be perceived in connection with tanks located and enclosed in the ground. It is generally advantageous to position the gauge or at least the indicator thereof within the structure or dwelling to which the fuel oil is supplied, but the drawback has been the difficulty of obtaining an accurate coordination of the gauge and tank. If the indicator be provided with means for setting the same, the gauge can be applied to any existing installation, regardless of the arrangement of the pipe line to which the gauge is connected, and irrespective whether the tank and pipe line are partially filled with fuel. Pressure corresponding to the liquid level is transmitted to the indicator by a gas filled conduit closed by a diaphragm against entrance of liquid thereinto. This diaphragm is quite pliable so as to be sensitive to small pressure changes. It is important that this diaphragm shall have an initial neutral position for maximum movement in opposite directions without strain. Further, since gases are subject to expansion and contraction due to temperature changes, it is desirable to set the diaphragm in an initial neutral position in the casing, where the latter has relatively large volume as compared with that of the small bore conduit. Therefore I have provided novel means for releasably initially setting the diaphragm, preferably after the indicator has been set.

Referring more particularly to the drawing, I show a gauge 26, which operates according to a closed air system. This gauge may be adjustable for setting, as by providing an indicator 55 having any adjustable mechanism. This indicator may include a casing 56 having an elastic box or pressure responsive diaphragm 57, which may preferably consist of a highly elastic thin sheet metal that may be corrugated. Centrally connected to said diaphragm is a socket means 58 which may frictionally rotatably engage a ball 59 of an actuator member 60 having a helical thread or cam. The latter may engage a female member 61 having a corresponding internal thread 62. The member 61 may have a shaft portion 63 journaled in a bearing 64 of a bracket 65 secured to the casing. Said shaft 63 may extend through a stationary dial 66 fixed in the indicator in any suitable manner, and a pointer 67 may be mounted on said shaft. It will now be seen that a movement of the diaphragm 57 causes a corresponding longitudinal movement of the screw 60, and hence causes the member 61 and pointer 67 to turn correspondingly.

To adjust the setting of the indicator mechanism, the screw 60 may have a very light leaf spring 69 extending through an arcuate slot 71 in the indicator casing. By moving the leaf spring along the slot, the screw 60 is turned to alter its relation with the member 61 and thus to set the pointer. After the indicator has thus been set, the leaf spring freely follows the movement of the diaphragm, and the setting of the screw 60 is unchanged by reason of the frictional engagement at the ball and socket joint 58, 59.

Communicating with the diaphragm is a conduit 72 which may be connected to a compartment 73 of the indicator, afforded by the diaphragm. Said conduit may be split, and the parts thereof interconnected by a union fitting 74 to facilitate mounting of the gauge by passing the conduit through any obstructing walls, floors or the like that there may be in the building. At its lower end the conduit 72 may communicate with a casing 75 having a diaphragm 76, dividing the casing into upper and lower compartments 77, 78. While the conduit is connected to the lower compartment, the upper compartment may be connected in any suitable manner with the pipe section 20 in an upward direction in such a manner that any air in the compartment 77 is caused to be displaced into the pipe line by the fuel therein. In this manner a true head can always be obtained.

If loss in pressure due to friction caused by the flow of the fuel through the pipe line is to be compensated for, a Pitot tube connection 79 may be used. In order that this connection may be sufficiently large for permitting displacement of air as aforesaid, an enlargement may be provided in the pipe line, as by placing a T fitting 80, and a bushing 81 for securing the Pitot in a liquid tight manner. The end of the Pitot tube may be located in the fitting, thus permitting the use of a substantially large connection, without obstructing the flow of the liquid through the pipe line 20.

The diaphragm 76 is preferably of highly pliable material such as leather, fabric, or composition material of the type known under the trade name of cellophane. In any case, diaphragm 76 is substantially more pliable than the metallic diaphragm 57. If a fibrous material be used, the same is preferably impregnated with a liquid or viscous material, of any kind or as hereinbefore referred to so that the air in the conduit system 72 and in compartments 73, and 78, forming the closed system, may be reliably maintained. The diaphragm 76 need not be elastic, and is preferably merely highly pliable so as to have a considerable amplitude of movement. This is important since the volume of the air in the closed system may be affected by temperature changes, but such changes will not materially affect the reading of the gauge where the diaphragm can move freeely to any corresponding degree. In other words, the precise position of deflection of the diaphragm will have little or no effect on the indicator 55, the latter being responsive solely to the pressure in the compartment 77. However, in installing the gauge, when the union fitting 74 is opened, the diaphragm will fall downward of its own weight into compartment 78 since the cushioning effect of the air is lacking. Consequently I may provide a setting means for the diaphragm, such as a set screw 83 having a disc 84 which can be moved upward by the screw to support the diaphragm in a neutral or mid position. When the union fitting 74 is again connected and the system closed, the disc and screw are lowered, the disc entering a recess 85 in the lower wall of the casing, and the screw being locked tight by a lock nut 86 or the like. The diaphragm 76 is now free to accurately respond to pressures, with a substantially equal amplitude up and down.

If the diaphragm tends to move too far in either direction, it is supported by one of the correspondingly curved walls of the casing. By horizontally mounting the diaphragm, the same is uniformly peripherally supported.

It will be appreciated that various changes and modifications may be made in the device as shown in the drawing, and that the same is submitted in an illustrative and not in a limiting sense, the scope of the invention being defined in the following claims.

I claim:

1. In a hydrostatic gauge, a casing member, a diaphragm member dividing the casing member into a plurality of compartments and movable along a path in said casing to affect said compartments, one of said compartments being communicable with a source of fluid pressure and the other being fluid filled and adapted for closed fluid communication with an indicator, and means for initially setting said diaphragm member, including an element mounted on one member and movable toward and away from the other member, said element movably engaging said other member to restrict the path of movement of the diaphragm to cause said initial setting of the same for a predetermined content of fluid in the closed communication with the indicator.

2. A device including a casing, a flexible diaphragm dividing the casing into compartments, one of said compartments being adapted to cause a predetermined quantity of pressure transmitting fluid to be maintained for actuation by the diaphragm, and means for initially setting the diaphragm, said casing having an opening, said means including an element movable through said opening toward and away from the diaphragm for releasably engaging and supporting the same, and means for causing said opening to be sealed.

3. A device including a casing, a flexible diaphragm dividing the casing into a plurality of compartments so that one of the compartments is adapted to have closed communication with an indicator, and means for initially setting said diaphragm against a premature pressure thereon, said casing having an opening, and said means including a portion actuable through said opening for movement toward and away from the diaphragm to engage and move the same into set position and to release the same for the operative condition of the diaphragm, and another portion extending around the first portion and interengaging the latter and the casing for sealing said opening.

PAUL KOLLSMAN.